United States Patent [19]

Victor

[11] 4,334,417
[45] Jun. 15, 1982

[54] METHOD FOR MANUFACTURING VEHICLE-WHEELS BY A MAGNETO-FORMING PROCESS AND WHEELS OBTAINED BY THIS METHOD

[75] Inventor: Rene Victor, Nogent-sur-Marne, France

[73] Assignee: Etablissements Letang & Remy, Paris, France

[21] Appl. No.: 204,387

[22] Filed: Nov. 5, 1980

[30] Foreign Application Priority Data

Apr. 29, 1980 [FR] France .................. 80 09637

[51] Int. Cl.³ ........................................ B21D 26/14
[52] U.S. Cl. ................................. 72/56; 29/159 R; 29/159.01; 29/421 M
[58] Field of Search ............ 72/56; 29/421 M, 159 R, 29/159.01

[56] References Cited

U.S. PATENT DOCUMENTS

| 3,271,716 | 9/1966 | Furth ................................. 336/181 |
| 3,431,625 | 3/1969 | Schenk et al. .................. 29/421 M |
| 3,442,013 | 5/1969 | Schenk et al. .................. 29/421 M |
| 3,528,596 | 9/1970 | Carlson ............................. 72/56 X |
| 3,688,373 | 9/1972 | Gregg ............................... 29/159 R |
| 3,823,589 | 7/1974 | Tikhonovich ....................... 72/56 |
| 4,083,215 | 4/1978 | Guetzlaff ......................... 29/159 R |
| 4,143,532 | 3/1979 | Khimenko et al. .............. 72/56 X |

*Primary Examiner*—Leon Gilden
*Attorney, Agent, or Firm*—Becker & Becker, Inc.

[57] ABSTRACT

A wheel blank consisting of a circular flange surrounded by a split rim, is placed inside cylindrical conformers having external faces reproducing the profile of the wheel rim, and thereafter a ring consisting of suitably connected coils gives the possibility to subject the split ring to a magneto-forming flux.

4 Claims, 4 Drawing Figures

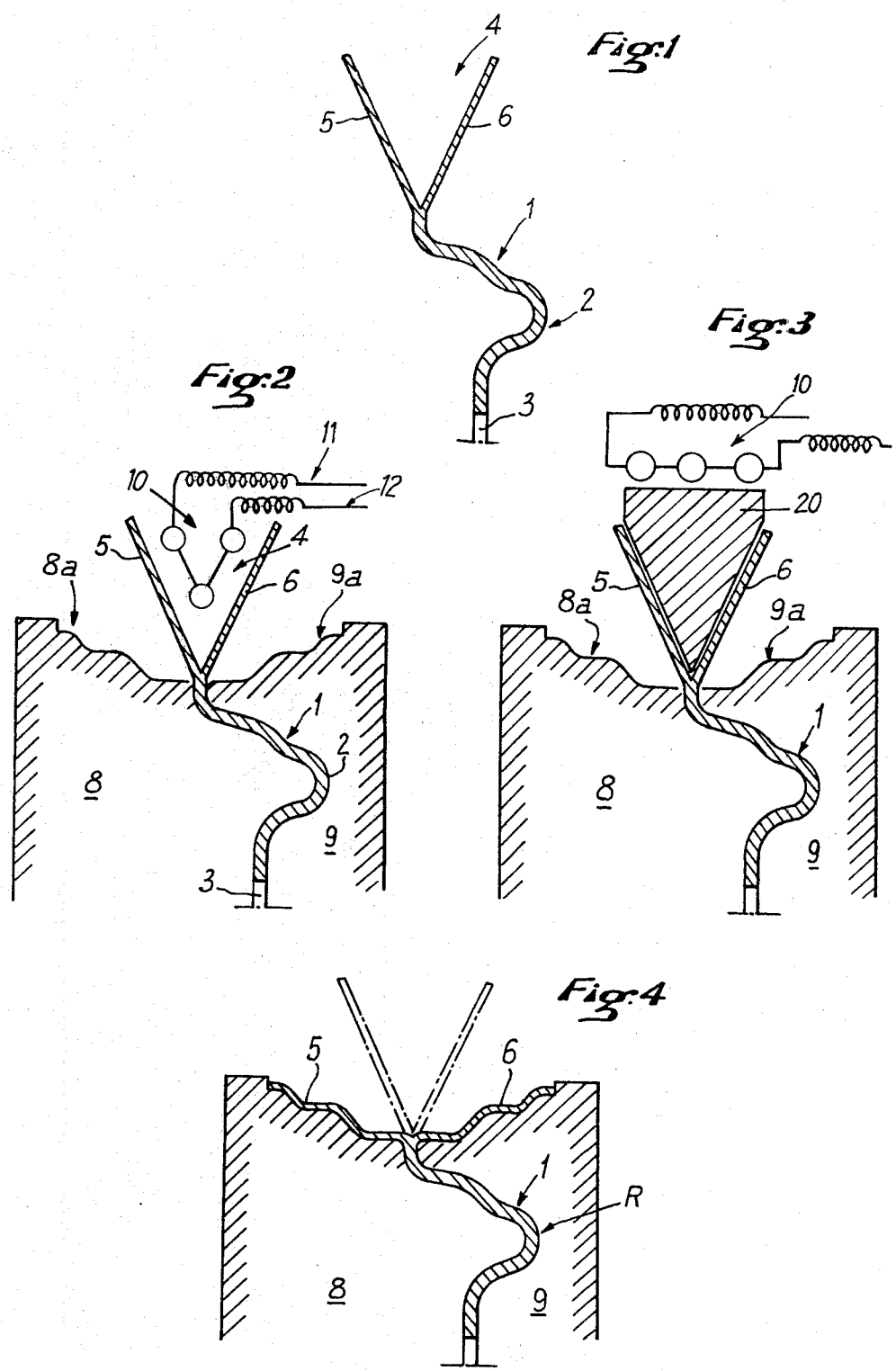

METHOD FOR MANUFACTURING VEHICLE-WHEELS BY A MAGNETO-FORMING PROCESS AND WHEELS OBTAINED BY THIS METHOD

There has already been known for a certain time, a method referred to as magneto-forming process, which has appeared as highly interesting for production of small workpieces, in particular copper workpieces, but up to now nobody has succeeded in applying magneto-forming to large workpieces of light metals or light metal alloys.

The present invention eliminates these drawbacks by providing a method for manufacturing by a magneto-forming process vehicle wheels from blanks made of a light alloy such as an alloy of aluminum, magnesium, etc.

According to the invention, the method comprises the steps of starting from a wheel blank consisting of a circular shaped flange surrounded by a split rim, placing inside said rim, in the form of rings as regular as possible, coils supplied from electrical capacitances which discharge on a resonant RLC circuit at a very high frequency, to form a rapidly variable magnetic discharge, then positioning around the lower portion of the split rim, cylindrical conformers having an outer wall reproducing the form of the rim; then these members being in position, subjecting the split portion adapted to form the rim of the wheel to said rapidly-variable magnetic discharge, so that the two components of the split rim are strongly repulsed by the discharge on the outer surface of the conformers in order to make the rim.

According to a further feature of the invention, the conformers are made of a highly conductive, non-magnetic material.

According to a further feature of the invention, for facilitating production of the coil, cores are placed within the central split delimited by the split rim, said cores forming magnetic field concentrators and being made of at least two semi-circular elements of aluminum with the coils used for the magneto-forming process being located thereabove, said coils being fed from a source of energy comprising a sufficient capacity assembly.

Further other features of the invention will become clear upon reading the following description with reference to the appended drawing in which:

FIG. 1 is a sectional elevation view of a half-blank of a wheel;

FIG. 2 shows the half-blank of the wheel positioned in the conformers and having received ring-shaped circular coils adapted to the execution of the magneto-forming process;

FIG. 3 is a cross section substantially identical to FIG. 2 but showing the location, in the split, of cores constituting magnetic-field concentrators to facilitate positioning of the unit; and FIG. 4 shows in section the operation of the apparatus permitting the production, for example, of a wheel for a motor-car.

In FIG. 1 there is shown in half section along a diameter a blank 1 for a wheel of which the flange 2 is provided in its center with a hole 3 adapted to the installation of the end of the axle-journal. The blank of FIG. 1 is not yet provided with holes for the passage of securing pins onto the hub. In some cases, the hole 3 is however used at the same time for the passage of the hub and the securement of the wheel on the axle-journal. There is seen most clearly, at the periphery of the wheel flange 2, a split portion 4 the arms 5, 6 of which are adapted to constitute, after conforming, the wheel rim.

In FIG. 2, the blank of FIG. 1 is placed inside conformers 8, 9 suitably clamped on the flange of the wheel, and the upper peripheral faces 8a, 9a have the accurate profile of the rim. Toroidal coils 10 suitably interconnected together and fed through wires 11, 12, give the possibility to subject the arms 5, 6 of the split portion 4 of the wheel to action of an electromagnetic force used for the magneto-forming process. This force is provided by discharge of capacitors charged from a sufficient current source so to obtain (e.g. from a force of several tens of kilojoules during a very short time period provided by the RLC relation of the coil) sufficient energy to apply the arms 5, 6 onto the periphery 8a, 9a of the conformers 8 and 9, thus to obtain the wheel R of FIG. 4.

In some cases as shown in FIG. 3, cores 20 are placed between the arms 5, 6 of the wheel blank 1, to form concentrators of the magnetic field immediatly under the coils 10. The cores 20, which are of a semi-toroidal shape, are most often made of aluminum and can also be made of an alloy of aluminum or copper.

The operation of the device is identical to that of the device described in relation with FIG. 2 and gives the possibility of making wheels of a light alloy of aluminum or magnesium.

It is to be understood that the description is in no way limited to the aforesaid embodiments and that numerous changes can be made therein without falling outside the scope of the appended claims.

I claim:

1. A method of manufacturing vehicle wheels by a magneto-forming process, comprising the steps of: starting from a wheel blank consisting of a circular shaped flange surrounded by a split rim; placing inside this rim, means as regular as possible supplied from electrical capacitances which discharge at high frequency to form a rapidly variable magnetic discharge; then placing around the lower portion of said split rim, cylindrical conformers having an outer wall reproducing the shape of the rim; and, when said conformers are in position, subjecting said split portion adapted to form the rim of the wheel to said rapidly-variable magnetic discharge so that the two components of said split rim are strongly applied by the discharge onto the outer surface of the conformers in order to make the rim.

2. A method according to claim 1, which includes the step of making said conformers of a conducting material.

3. A method according to claim 1, which includes the step of placing cores inside the central split delimited by said split rim, said cores forming magnetic field concentrators and being made of at least two semi-circular members of aluminum, with said coils used for the magneto-forming being placed thereabove, said coils being fed from a source of energy comprising a sufficient capacity assembly.

4. A method according to claim 1 including providing coils in the form of rings as the means supplied from electrical capacitances.

* * * * *